UNITED STATES PATENT OFFICE 2,063,154

FUSED REFRACTORY COMPOSITION

George J. Easter and Charles McMullen, Niagara Falls, N. Y., assignors to The Carborundum Company, Niagara Falls, N. Y., a corporation of Pennsylvania No Drawing. Application December 18, 1933, Serial No. 702,942

7 Claims. (Cl. 13—36)

This invention relates to a new and useful composition of matter formed by the fusion of ingredients including chromite and alumina. If a source for these ingredients is available in which they occur in suitable proportions and sufficiently free from undesirable ingredients, fusion of the same, if carried out as taught herein, will result in our new composition of matter. The chromite ores with which we are familiar, however, are generally deficient in alumina for the purpose we have in mind; and moreover, in these ores the chromite is always associated with impurities which are likely to result in defects in the product obtained by fusing these ores in accordance with the usual practice. We have discovered that by the fusion of chromite ores with alumina we are able to obtain products which retain the refractory and other desirable characteristics of fused chromite ores, but in which the defects caused by the associated impurities are minimized.

Chromite, or chrome spinel as it may be designated, which is the essential ingredient of chromite ores, is not a compound having a rigid chemical composition but is rather a member of the distinctive family of double oxides of iron and chromium whether or not combined with magnesia and alumina. These double oxide minerals all crystallize in the isometric system and in isomorphous combination. The family is usually designated chemically as $$(Fe, Mg)O \cdot (Al, Fe, Cr)_2O_3$$

although the oxides of Fe and Cr predominate in respective groups. This is the material referred to as chromite or chrome spinel hereafter in this specification and in the appended claims. In chromite ores silica, generally in some combined form, is also always present. Chromite is probably the most useful chemically neutral refractory material known. However, on account of its associated impurities which cannot be separated by any known method of beneficiation, the desirable properties of chromite are somewhat minimized. In any case, it is highly desirable to choose chromite ores that are low in magnesia and silica. If a chromite ore containing too much magnesia is fused, the product tends to be basic; while the product of the fusion of an ore containing too much silica tends to be excessively acid (using the terms basic and acid in the conventional metallurgical sense). Ferrous iron is not an undesirable ingredient in the ore which is selected for fusion, as long as there is present at least one molecular equivalent of chromium oxide ($Cr_2O_3$) for each molecule of ferrous oxide (FeO) or when any excess of ferrous oxide thereover is corrected by the addition of alumina as hereinafter described. In no case can chromite ore entirely free of undesirable ingredients be found, but in accordance with our invention their bad effects are overcome.

We have discovered that when alumina is fused with chromite the resulting fusion is essentially a homogeneous crystalline composition. Apparently, increasing the proportion of alumina does not cause free alumina to crystallize out, even in pieces made in accordance with our invention and containing as high as about 80% $Al_2O_3$ by weight, as no free alumina is to be found by petrographic examination of such pieces. The alumina is apparently all taken up into solid solution by the chromite as it solidifies from the molten state.

The chromite-alumina fusion is found to be microscopically a dense mass of chrome spinel crystals, tending to take the form of octahedrons, which is the crystal habit found in the isomorphous spinel family. Like fused chromite itself, the chromite-alumina solid solution is isotropic or only very slightly birefringent. Crystallographically, there is no essential difference between the fused chromite and a fusion of the same chromite with alumina, except in the latter case the interstitial material due to the impurities (generally silicates) is very much smaller in amount so that the crystalline grains are densely packed and the homogeneity of the final product greatly improved. The result is that the refractory and chemical inertness is increased. It seems furthermore that in a solid solution of two oxides, the chemical properties of the more inert ingredients are given to the solid solution.

In choosing raw material, we prefer using chromite ore high in chromium oxide, and low in silica and magnesia, but we do not limit ourselves to any particular chromite ore.

In a typical example, with 25 parts by weight of chromite ore we mixed 75 parts by weight of a fused alumina by-product containing approximately 95% $Al_2O_3$, the balance being chiefly oxides of iron and titanium. While the purer the alumina the better, we may use any source of material high in alumina, even bauxite. Impurities do not spoil the crystalline structure, as the chrome spinel will take up the alumina into solid solution, while the excess magnesia and substantially all of the silica, is found in the interstices between the crystals. In order to decrease the amount of silica and magnesia in the final product, there should generally be at least equal parts by weight of alumina and chromite ore in the original mix and up to 85 parts of alumina to 15 parts of chromite ore may satisfactorily be used.

In carrying out our invention we have found it satisfactory to use an electric furnace similar to that commonly used for the production of fused alumina for abrasive purposes, generally consisting of a water cooled iron shell without any lining other than that built up by the material being fused as it is fed into the furnace. Fusion is effected initially by the heat from an electric arc between two or more electrodes inserted in the iron shell; but after a bath of molten material is formed, the resistance of this material to the passage of electric current through it is used to supply heat. The material is gradually fed in, and the electrodes raised as the fused mass is built up.

If a fairly pure source of alumina is used, such as fused alumina by-product, the ingredients to be used are first crushed to about 1/8" to 1/4" and finer and then mixed together before fusion. Where bauxite ores are used as a source of alumina, instead of mixing the materials together, we first furnace the bauxite with sufficient carbon to reduce out various impurities such as iron oxide and silica; and the chromite ore is then added, dissolving homogeneously in the molten alumina. The furnace is ordinarily operated, however, so that there will be a minimum amount of reduction of the ore particularly the chromite. However, where there is an excess of silica it may under some conditions be desirable to operate the furnace under reducing conditions, even after the chromite is added, so that as much silica as possible may be reduced and volatilized.

Care must always be taken not to reduce the chromium oxide nor the major portion of the ferrous oxide to metal. Any iron oxide in these fusions is always in the ferrous condition, generally combined with the chromic oxide in the equimolecular proportion to form ($FeCr_2O_4$). However, it sometimes happens that an excess of iron over the amount necessary to form chrome spinel is present in the chromite, and this excess ferrous iron we combine with alumina to form iron spinel ($FeAl_2O_4$), which in turn combines homogeneously with the chrome and other spinels in the fusion. If it should so happen that the ore is unusually rich in chromic oxide we may even add iron oxide ores to increase the amount of iron spinel, which in turn may dissolve a large excess of alumina in solid solution.

We have found that when mixes of these compositions are properly fused, they are very fluid. The furnace may be adapted either for tapping the molten material out through its side, or it may be arranged to be tilted so as to pour the material into the mold. Particularly in the latter case, it is desirable that provision be made to prevent molten material spilling into the water cooling system. This may be accomplished by the use of an iron apron properly positioned.

The molten material is heated to a temperature considerably above its melting point, and is then poured into molds which may be of granular refractory material bonded with a core binder such as is commonly used in foundry practice, or may be made of slabs of preburned refractory, of carbon, or of a suitable metal. These molds may be preheated if desired, and may be insulated to prevent too rapid loss of heat, by embedding them in a molding flask in which they are surrounded by sand or other heat insulating material.

The molds should be provided with risers of ample size to permit complete filling of the mold without interference by material freezing in the headers. If the riser is made wedge shaped with its minimum section immediately adjoining the mold, removal of the excess material constituting a header is facilitated. After a mold is filled it is moved away and additional molds also filled successively.

Instead of pouring the molten refractory material into molds, it is also possible to utilize the furnace itself as a mold, in which case it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc. as in the other type of mold. It is sometimes desirable to provide furnace molds of this type with a small dimensional draft to facilitate removal of the piece from the mold although due to the considerable shrinkage after solidification this is in general unnecessary.

The molded pieces may be left in the mold for heat treatment; or, in the case of iron molds particularly, the pieces may be taken from the molds shortly after the outer walls of the casting have solidified and then annealed without other than their own support. The headers should be removed from the castings at this point by sledging, as the castings are tougher at this stage than when cold and there is less danger of their being cracked by the hammering. With a header tapering to a smaller sectional area next the casting, removal in this manner is usually simple and fairly clean.

For annealing we may utilize any of the customary annealing practices such as placing the molded pieces in a furnace and gradually reducing their temperature, covering the pieces with hot sand or other insulating material, or heavily insulating the pieces and allowing them to anneal by virtue of their own heat or by that of other blocks packed closely together with them.

The time-temperature curve required to secure given results naturally varies with the shape and size of the pieces and also with the exact composition of the material being cast. In general it may be said that if a given rate produces cracking it is obviously desirable to further retard the rate of cooling over some or all of the cooling range.

After the pieces are cold any objectionable remainder of the header or other minor protuberances may be removed by chipping, or in minor cases by grinding.

Refractory shapes made in this way are of particular value in various metallurgical applications, both in ferrous and non-ferrous furnaces, electric furnaces, chemical processes, etc. Their slag resistance makes them useful furthermore in general refractory service such as boiler furnace walls.

We also make use of refractory grain prepared from pigs of these fusions, combining these grains in proper grit mixtures as is the general practice in high grade bonded refractories, preferably using as a bond raw material similar in composition to the grain itself and firing to high temperature in ceramic kilns.

While it is broadly new to fuse alumina with chromite (chrome spinel) to form a solid solution of alumina and chromite, and in its broader aspects our invention is not limited to the proportions of alumina and chromite; we have found it particularly advantageous to maintain the chromite content above a lower limit of about 10%. We get desirable characteristics when we maintain the $Cr_2O_3$ content at 10% or more, and the FeO content at 6% or more. Accordingly, for the best results we do not go below these lower limits for the composition of the solid solution. Moreover, as a lower limit we prefer that the $Al_2O_3$ content shall not be less than about 50% and as an upper limit we prefer that the $Al_2O_3$ content shall not be more than 80%. The lower limit of $Al_2O_3$ is somewhat arbitrary, and dependent upon the chromite ores as we find them; as our reason for thus setting a limit of about 50% is that impurities are so generally associated with the chromite in the ores that it is necessary to add about 50% or more of alumina to obtain sufficient dilution of the impurities.

One of the beneficial uses of this invention as a refractory is that a chrome spinel refractory can be made low in magnesia and silica; and in the final product the silica should be less than 5% and the magnesia less than 12%, though generally in actual practice the combined silica and magnesia will be less than 10% if suitable chromite ores be used.

We have described our invention as applied principally as a refractory, but it has other chemical and mechanical uses. For example, it has good qualities as an abrasive grain, as its crystals fracture in such a way as to have advantageous characteristics as an abrasive; and it is tougher than any ordinary spinel material. Furthermore, on account of the combined alumina, it is harder than any straight spinel composition, at the same time retaining the crystal properties such as cubic cleavage characteristic of isometric crystals.

While we have briefly referred to certain representative uses to which our new composition of matter may be put, others will readily occur to persons skilled in the art to which they pertain. We have described certain details of the impurities generally found in chromite ores, and preferred methods of minimizing the content of such impurities in the product obtained by the fusion of these ores with alumina. It is to be understood that while we have described with elaboration of certain details the way in which we at present prefer that our invention be embodied and practiced, our invention may, by following the broad teaching thereof, be otherwise embodied and practiced within the scope of the following claims.

We claim:

1. The process of treating chromite ore comprising fusing chromite ore with iron oxide and at least 50% alumina in an electric furnace, controlling the reduction so that the ratio of iron oxide content to chromium oxide content does not fall below the equi-molecular ratio, and allowing the molten mass to cool slowly to form a homogeneous crystalline mass.

2. The process of treating chromite ore comprising fusing chromite ore with iron oxide and at least 50% alumina in an electric furnace, controlling the reduction so that the ratio of iron oxide content to chromium oxide content does not fall below the equi-molecular ratio, casting the molten mass in molds and cooling the castings slowly.

3. As a refractory material, a fusion of chrome ore and aluminum oxide, the said fusion consisting essentially of a solid solution of aluminum oxide and chromite in which solution aluminum oxide is present in solid solution in addition to any aluminum oxide present as a spinel in the chromite, any residual impurities from the chrome ore and aluminum oxide being present as interstitial impurities in the final fusion.

4. As a refractory material, a fusion of chrome ore, aluminum oxide and iron oxide, the said fusion consisting essentially of a solid solution of aluminum oxide and chromite in which solution aluminum oxide is present in solid solution in addition to any aluminum oxide present as a spinel in the chromite, any residual impurities from the chrome ore, aluminum oxide and iron oxide being present as interstitial impurities in the final fusion.

5. As a refractory material a fusion of chrome ore and aluminum oxide, the said fusion consisting essentially of a solid solution of aluminum oxide in which solution the aluminum oxide present in solid solution in addition to any aluminum oxide present as a spinel in the chromite constitutes at least 50% of the fusion, any residual impurities from the chrome ore and aluminum oxide being present as interstitial impurities in the final fusion.

6. The method of making refractory material which consists in fusing chrome ore and alumina whereby the fusion consists essentially of a solid solution of aluminum oxide and chromite in which solution aluminum oxide is present in solid solution in addition to any aluminum oxide present as a spinel in the chromite.

7. A cast refractory article consisting of a fusion of chrome ore and alumina, the said piece consisting essentially of a solid solution of aluminum oxide and chromite in which solution aluminum oxide is present in solid solution in addition to any aluminum oxide present as a spinel in the chromite, any residual impurities from the chrome ore and aluminum oxide being present as interstitial impurities in the final fusion.

GEORGE J. EASTER.
CHARLES McMULLEN.